United States Patent
Leu et al.

(10) Patent No.: US 6,695,217 B2
(45) Date of Patent: Feb. 24, 2004

(54) REGULATING VALVE

(75) Inventors: Peter Leu, Ostfildern-Nellingen (DE); Jörg Luckner, Kornwestheim (DE)

(73) Assignee: Behr Thermot-Tronik GmbH (DE)

( * ) Notice: Subject to any disclaimer, the term of this patent is extended or adjusted under 35 U.S.C. 154(b) by 0 days.

(21) Appl. No.: 10/003,879

(22) Filed: Oct. 25, 2001

(65) Prior Publication Data

US 2002/0047050 A1 Apr. 25, 2002

(30) Foreign Application Priority Data

Oct. 25, 2000 (DE) .......................... 100 53 699

(51) Int. Cl.[7] .............................................. G05D 23/12
(52) U.S. Cl. ..................... 236/34.5; 236/84; 236/DIG. 2
(58) Field of Search ...................... 236/34.5, 84, DIG. 2

(56) References Cited

U.S. PATENT DOCUMENTS

| | | | | |
|---|---|---|---|---|
| 3,207,435 A | * | 9/1965 | Erickson et al. | 236/12.12 |
| 3,337,130 A | * | 8/1967 | Erickson | 236/12.12 |
| 4,193,541 A | | 3/1980 | Scheidweiler | 236/1 G |
| 4,537,158 A | * | 8/1985 | Saur | 123/41.1 |
| 4,550,693 A | * | 11/1985 | Saur | 123/41.1 |
| 4,674,679 A | * | 6/1987 | Saur | 236/34.5 |
| 4,848,652 A | * | 7/1989 | Kennedy | 236/34.5 |
| 4,890,790 A | * | 1/1990 | Wagner | 236/34.5 |
| 4,961,530 A | * | 10/1990 | Wagner | 236/100 |
| 5,195,467 A | * | 3/1993 | Kurz | 123/41.1 |
| 5,979,373 A | * | 11/1999 | Sano | 123/41.08 |

FOREIGN PATENT DOCUMENTS

| | | |
|---|---|---|
| DE | 34 15 876 A1 | 10/1985 |
| DE | 34 40 198 A1 | 5/1986 |
| DE | 91 05 021 U1 | 6/1991 |
| DE | 91 10 126 | 12/1992 |
| EP | 0 346 892 A2 | 12/1989 |

* cited by examiner

Primary Examiner—William E. Tapolcai
(74) Attorney, Agent, or Firm—Kennedy Covington Lobdell & Hickman, LLP

(57) ABSTRACT

A regulating valve for a heat-transferring medium has a valve member controllable primarily by an electrical actuating member, but in the event of failure of the electrical actuating member, a thermostatic actuating member, operating independently of the electrical actuating member and of electric power, is provided in order to prevent damage to the system by driving the valve member when a predetermined temperature is exceeded.

7 Claims, 3 Drawing Sheets

REGULATING VALVE

CROSS-REFERENCES TO RELATED APPLICATIONS

This application claims the benefit of German patent application number 10053699.9, filed Oct. 25, 2000, incorporated herein by reference.

FIELD OF THE INVENTION

The invention relates to a valve system for regulating a heat-transferring system, in which the valve member can be adjusted by means of an electrical actuating member.

BACKGROUND OF THE INVENTION

Regulating valves of this kind are frequently employed in cooling circuits in which it is desirable to maintain a system temperature within a range of tolerable operating temperatures. The electrical actuating member drives the valve member through a range varying from fully closed to fully open in order to adjust the amount of coolant flowing through the circuit and to maintain a system temperature within a preferred range. The electrical actuating member may be controlled through various means, including thermostatically, manually, or through automatic computer control. Valve systems of this type are well known in the art and take many different forms depending on the particular type of flow regulation needed.

The principal drawback of these systems, however, is in the potential for loss of control over the electrical actuating member. Such a loss of control might occur for a number of reasons, such as loss of electrical current, damage to the drive motor, failure of an automatic control, loss of communication between control and drive, or some other defect in the system. The loss of control may lead to a system temperature in excess of the tolerance of the system, which in turn leads to damage either to the cooling system itself or to the object to be cooled. It is therefore desirable to employ a system through which it is possible to drive the valve independently of any electrical energy source.

OBJECT AND SUMMARY OF THE INVENTION

It is accordingly an object of the invention to provide a regulating valve for a heat transferring system which will substantially avoid faulty operation even in the event of a loss of electrical current or errors in the transmission of control signals. A more specific object is to provide a regulating valve that is primarily adjustable by means of an electric drive, but comprises a secondary, failsafe, non-electric drive that prevents faulty operation or, at a minimum, mitigates its effects, even in the unavailability of the primary control.

In order to meet this object, the present invention provides a valve system for regulating a heat transferring system which comprises a valve member in combination with both an electrical actuating member and a secondary actuating member that operates thermostatically to drive the valve. This secondary actuating member is generally exposed to the regulated medium and is designed to react at a predetermined temperature of the regulated medium. When the temperature of the regulated medium is above a predetermined level, the secondary actuating member drives the valve into a position such that overheating of the system is prevented.

Because the drive function of the secondary actuating member is controlled thermostatically and independently of the primary actuating member, the present invention provides a safety function that is completely independent of—and immune to the failure of—the primary, controlled drive. Damage to the system is prevented by predetermining a temperature, somewhat below the maximum tolerable operating temperature, above which the thermostatic actuating member will operate to force the cooling of the system, preventing the system from exceeding the maximum tolerable operating temperature.

In one embodiment, the valve member is a rotary slide valve, which rotates about a shaft. The thermostatic actuating member is positioned within the flow of the regulated medium (and thus is sensitive to the temperature of that medium) and further positioned to drive an arm attached to the shaft of the rotary slide valve. During normal operation, the electrical actuating member drives the rotary slide valve independently of the thermostatic operating element. However, if the predetermined temperature should be exceeded, such an exceptional condition indicates a possible failure of the electric drive itself, loss of control over the electric drive, or some other failure which necessitates override of the electrical drive. In the event of such an override condition, the thermostatic actuating member drives the arm of the shaft and forces the rotary slide valve into a fully open position. The rotary slide valve can only be retracted from this position when the reaction temperature has again fallen below the predetermined level.

In another embodiment of the invention, the thermostatic actuating member is positioned between the electrical actuating member and the valve member. During normal operation, the thermostatic actuating member is in a retracted position, but because of the arrangement of the members, transfers the force generated by the action of the electrical actuating member to the valve. If a predetermined temperature is exceeded, the thermostatic actuating member generates an additional drive movement, which drives the valve member into its open position.

In still another embodiment of the present invention, the thermostatic actuating member is positioned such that, during an override condition, it drives the valve directly rather than by means of a shaft arm. Such a configuration enables the thermostatic actuating member to drive the valve independently of the operation of the electrical actuating member or of the presence of any particular elements of the electrical actuating member.

In still another embodiment of the invention, the thermostatic operating element is positioned within a mixing chamber, into which fluid from multiple inlets is communicated. Typically, one inlet will communicate hot fluid (such as fluid returning from cooling an internal combustion engine) and another will communicate cooled fluid (such as from a radiator or a reservoir) into the mixing chamber. The valve member is designed to permit hot fluid, cooled fluid, or a combination of the two to flow into the mixing chamber. The thermostatic actuating member is positioned such that, during an override condition, it drives the valve so as to increase the flow of cooled fluid and decrease the flow of hot fluid into the mixing chamber.

Further characteristics and advantages of the invention may be observed from the subsequent description of the embodiments represented in the drawings.

DETAILED DESCRIPTION OF THE PREFERRED EMBODIMENTS

Figure 1:
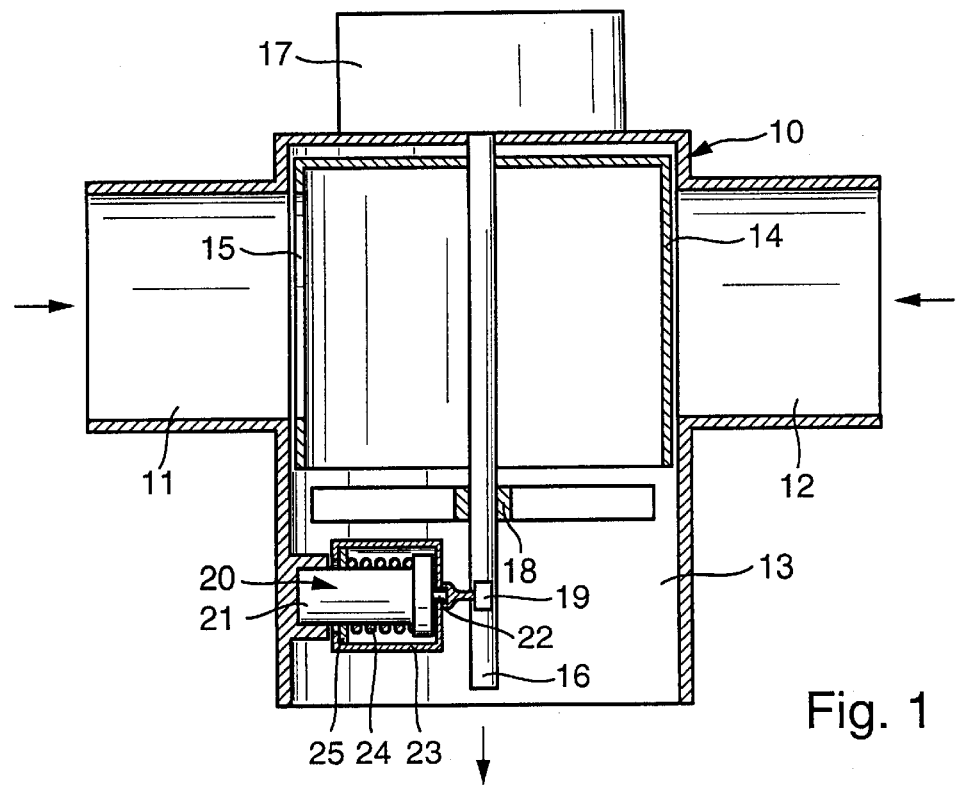
FIG. 1 is a cross-sectional view of a regulating valve with a rotary slide valve.

FIG. 1 illustrates a cross-sectional view of a valve for regulating the coolant temperature of, for example, an internal combustion engine. It comprises a valve housing 10 with a first inlet 11 for a liquid coolant coming from an engine outlet, which coolant has been heated by the engine (not shown). A second inlet 12 communicates coolant from a coolant radiator (not shown). These two coolant flows are brought together in a mixing chamber 13, which comprises an outlet for communicating the coolant flow back to the internal combustion engine. A rotary slide valve 14 is disposed to control inlets 11, 12. Rotary slide valve 14 rotates about a shaft 16 and is provided with a window 15. Through rotation about shaft 16, window 15 can be positioned in a number of configurations. In one configuration, the connection between inlet 11 and mixing chamber 13 is open, while the connection between inlet 12 and mixing chamber 13 is closed. In another configuration, the connection between inlet 11 and mixing chamber 13 is closed, while the connection between inlet 12 and mixing chamber 13 is open. Alternatively, the window may be positioned so that both connections between inlets 11, 12 to mixing chamber 13 are partially open.

Rotary sliding valve 14 is cup-shaped and is positioned on shaft 16, which may be a part of or attached to electrical actuating member 17. Electrical actuating member 17 may be a proportional magnet, a DC motor, a linear motor, a step motor, or any other means for actuating rotary sliding valve 14. Shaft 16 is further seated within mixing chamber 13 by means of bearings 18.

Arm 19 is attached to the shaft and extends radially therefrom. Thermostatic actuating member 20 is positioned within mixing chamber 13 so that transverse motion of thermostatic actuating member 20 exerts a force on arm 19. Thermostatic actuating member 20 constitutes an auxiliary actuating drive with an extension direction running transversely with respect to shaft 19. Thermostatic operating element 20 comprises a housing 21, which is fixedly mounted within mixing chamber 13. Housing 21 is filled with an expandable material (such as a wax mixture) that expands when heated above a predetermined temperature. The predetermined temperature will be selected according to the heat tolerances of the regulated system and will lie in the upper portion of the tolerated range, above the temperature of normal operation. Work piston 22 of thermostatic actuating member 20 acts on a cup-shaped transfer element 23, which is arranged to drive arm 19 of shaft 16. Cup-shaped transfer element 23 extends around the housing 21 of the thermostatic operating element and is bent at right angles at its open end. The bent end retains a spring washer 25, which supports a prestressed restoring spring 24. The opposite end of prestressed restoring spring 24 is supported on an annular collar of housing 21.

When the predetermined reaction temperature has been reached and exceeded, work piston 22 is extended, carrying along transfer element 23. Transfer element 23 in turn drives arm 19 to turn shaft 16 in such a way that rotary slide valve 14 is rotated, increasing fluid flow between inlet 12 and mixing chamber 13 and decreasing fluid flow between inlet 11 and mixing chamber 13.

If the electrical actuating member fails, thermostatic actuating member 20 acts as an auxiliary actuating drive and prevents the system from exceeding the maximum tolerable operating temperature. Thermostatic actuating member 20 may also be configured to serve a regulating function. As the operating temperature falls below the predetermined temperature, the expanded material within housing 21 contracts, enabling restoring spring 24 to pull work piston 22 and transfer element 23 back once the predetermined maximum temperature has fallen below the permissible value. Additionally, in order to provide this regulating function it would be necessary to provide shaft 16 with a second restoring spring.

Figure 2:
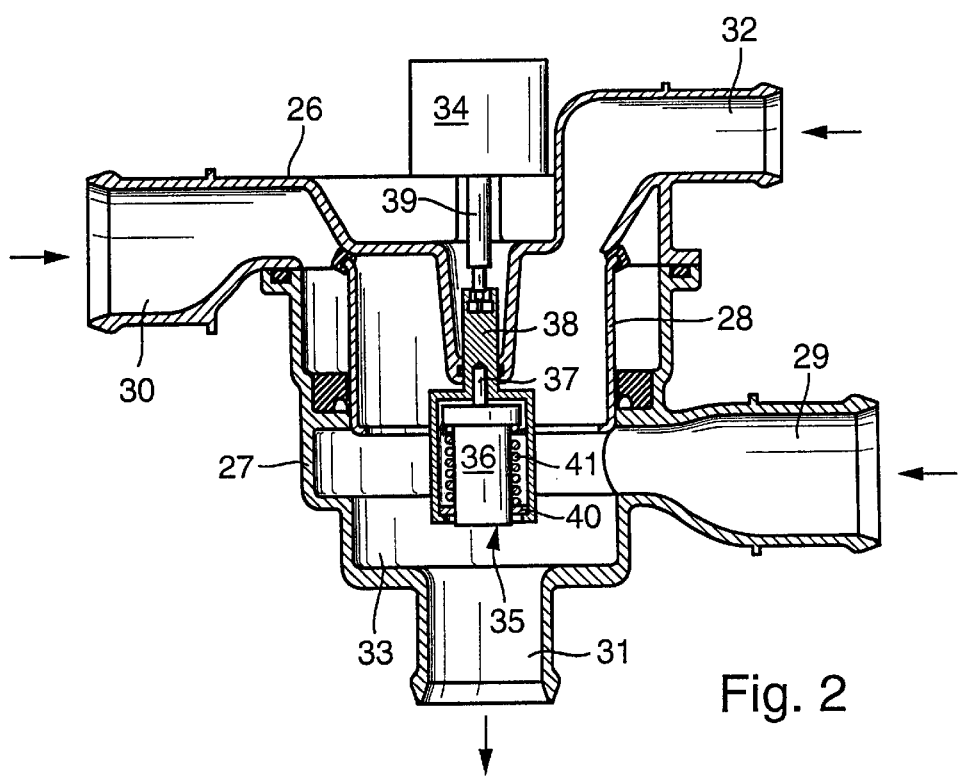
FIG. 2 is a cross-sectional view of a regulating valve with an axial slide; and FIRG. 2A is a partial detail view of a valve as in FIG. 2.

FIG. 2 illustrates an alternative embodiment of the present invention. The regulating valve as depicted in FIG. 2 may also be used for regulating the coolant of an internal combustion engine, for example. An axial slide 28 is the valve member in a two-piece valve housing 26, 27.

Valve housing 26, 27 is provided with an inlet 29 for coolant coming directly from the engine outlet (not shown), with an inlet 30 for cooled coolant coming from a radiator (not shown), and with a connector 31, which permits coolant flow out from the valve into, for example, a coolant pump. In addition, valve housing 26, 27 comprises an inlet 32, through which returns coolant that has been conducted through an auxiliary device, such as a heater or the like.

Axial slide 28 regulates the connection between inlets 29, 30 to mixing chamber 33, from which the coolant flows. Before the internal combustion engine has reached its operating temperature, coolant flowing through inlet 29 flows into mixing chamber 33, while coolant flowing through inlet 30 is blocked. If a heater or the like has been turned on, the coolant coming from it also flows through inlet 32 directly to mixing chamber 33, because the axial slide 28 has an open bottom. If the axial slide 28 is displaced axially (downward) out of the illustrated position, the connection between the inlet 30 and the mixing chamber 33 is opened, while the connection between the inlet 29 and the mixing chamber 33 is correspondingly decreased and, if required, completely closed. The displacanent of the axial slide 28 is performed by means of electrical actuating member 34, which may be a proportional magnet, a DC motor, a linear motor, a step motor, or any other means for actuating axial slide 28. A thermostatic actuating member 35 is positioned as part of the drive connection between electrical actuating member 34 and axial slide 28. Thermostatic actuating member 35 comprises housing 36, which is located inside mixing chamber 33. An expandable material (again, for example, a wax mixture), fills housing 36. If a predetermined temperature is exceeded, a work piston 37 is extended out of housing 36. The work piston 37 is supported on a transfer element 38, which is connected with the actuating spindle 39 of the actuating drive. A center element 28a (see FIG. 2A). retained by means of links, of the bottom of the axial slide 28 rests a t a side facing away from the work piston 37 of an annular collar of the housing 36 of the thermostatic operating element. With a cage-like portion, the connecting element 38 extends around the housing 36 of the thermostatic operating element and has an edge, bent at right angles on its open end. A spring washer 40 is retained on this edges on which a prestressed restoring spring 41 is supported. The opposite end of this restoring spring 41 is supported on the annular collar of the housing 36.

Figure 2A:
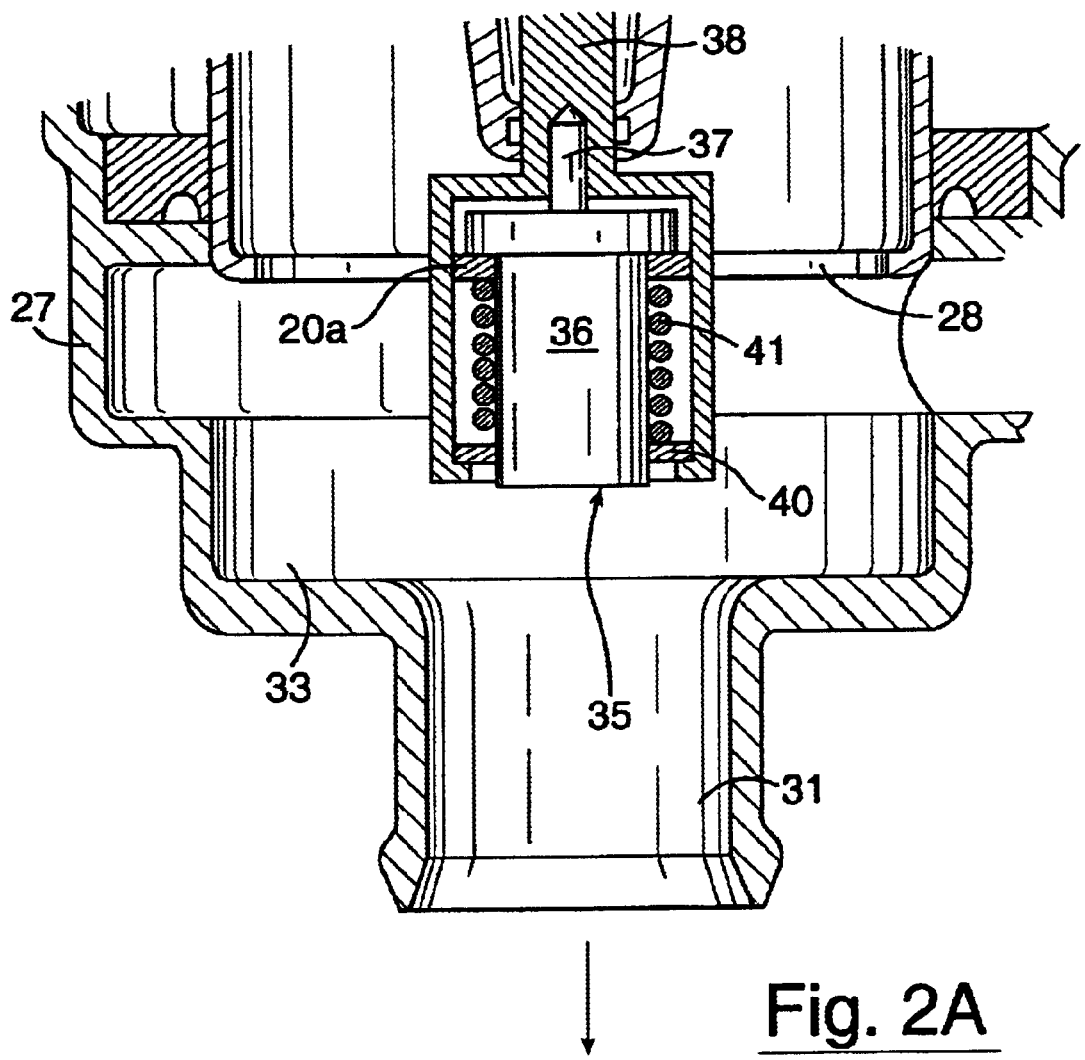

As can be seen in FIGS. 2 and 2A, the spoked bottom of axial slide 28 extends radially inward through the cage-like lower section of transfer element 38 and rests against a side of an annular collar of housing 36 at a ring 28a, which is part of the bottom of axial slide 28.

If the temperature in mixing chamber 33 exceeds the preset temperature, for example because electrical actuating member 34 does not operate or respond, work piston 37 is extended out of the housing 36. Because of this, the housing 36 is moved in relation to the work piston against the restoring spring 41. Housing 36 drives axial slide 28 so that the connection between inlet 30 (communicating cooled fluid) and mixing chamber 33 is opened. As in the previous embodiment, thermostatic actuating member 35 can regulate coolant flow through the system by retracting when coolant temperature again falls below the predetermined temperature.

Figure 3:
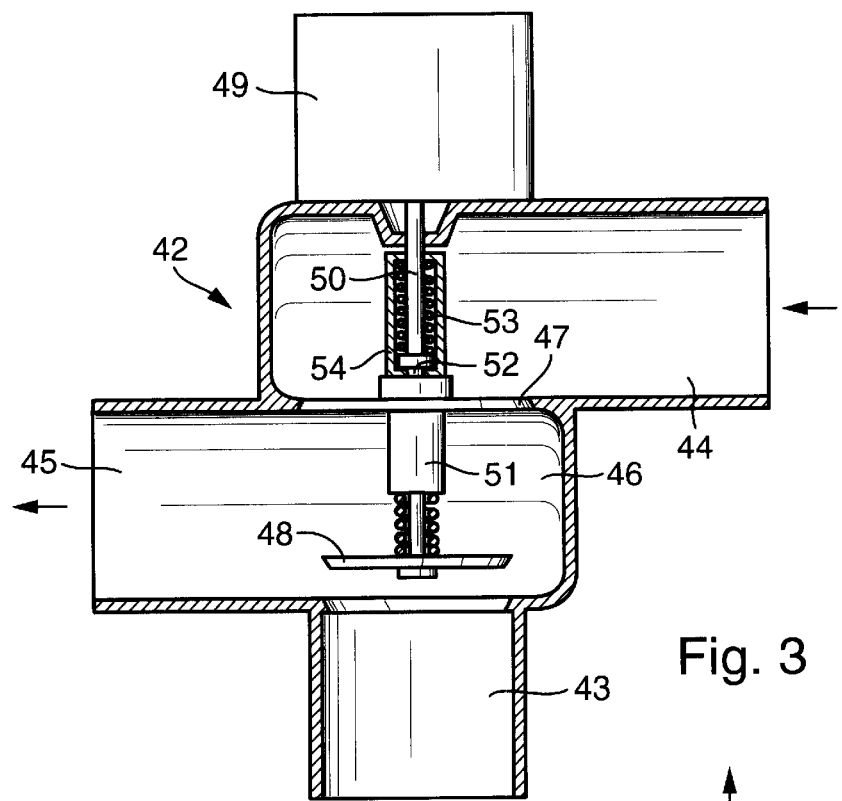
FIG. 3 is a cross-sectional view of a regulating valve with a main valve disk and a bypass valve disk.

Referring now to FIG. 3, still another embodiment of a regulating valve, suitable for use in a coolant circuit in an internal combustion engine, is represented in cross-section. Valve housing 42 is provided with a first inlet 43 for coolant flowing directly from the internal combustion engine, a second inlet 44 for coolant flowing from a coolant radiator, and a connector 45 leading back to the internal combustion engine. Mixing chamber 46 is located between the two inlets 43, 44. The connection of mixing chamber 46 with inlets 43, 44 is regulated by a main valve disk 47 and a bypass valve disk 48.

The position of valve disks 47, 48 is fixed by means of an electrical actuating member 49, which can be a proportional magnet, a DC motor, a linear motor, a step motor, or any other means for actuating valve disks 47, 48. Drive element 50 is linearly displaceable and is connected with valve disks 47, 48. A thermostatic operating element 51 is interposed between valve disks 47, 48. Housing 80 of the thermostatic actuating member 51, to which a bolt 81 receiving bypass valve disk 48 has been welded, contains an expandable material (such as a wax mixture) that expands when heated above a predetermined temperature. The predetermined temperature will be selected according to the heat tolerances of the regulated system and will lie in the upper portion of the tolerated range, above the temperature of normal operation. Under normal operation the position of the valve disks 47, 48 is determined solely by electrical actuating member 49. However, if the predetermined temperature of the thermostatic actuating member 51 is exceeded (thus inducing a condition of exception operation), work piston 52 of the thermostatic actuating member 51, which is supported on the drive element 50 of the electrical actuating member 49, is extended. Housing 80 of thermostatic actuating member 51, together with valve disks 47, 48, are displaced in the opening direction, so that an increased amount of cooled coolant is communicated into mixing chamber 46 through inlet 44.

Drive element 50 of electrical actuating member 49 is provided with an annular collar, on which a prestressed restoring spring 53 is supported. The opposite end of the prestressed restoring spring 53 is fixedly connected via a retaining element 54 with the housing of the thermostatic operating element 51.

Figures 4, 5:
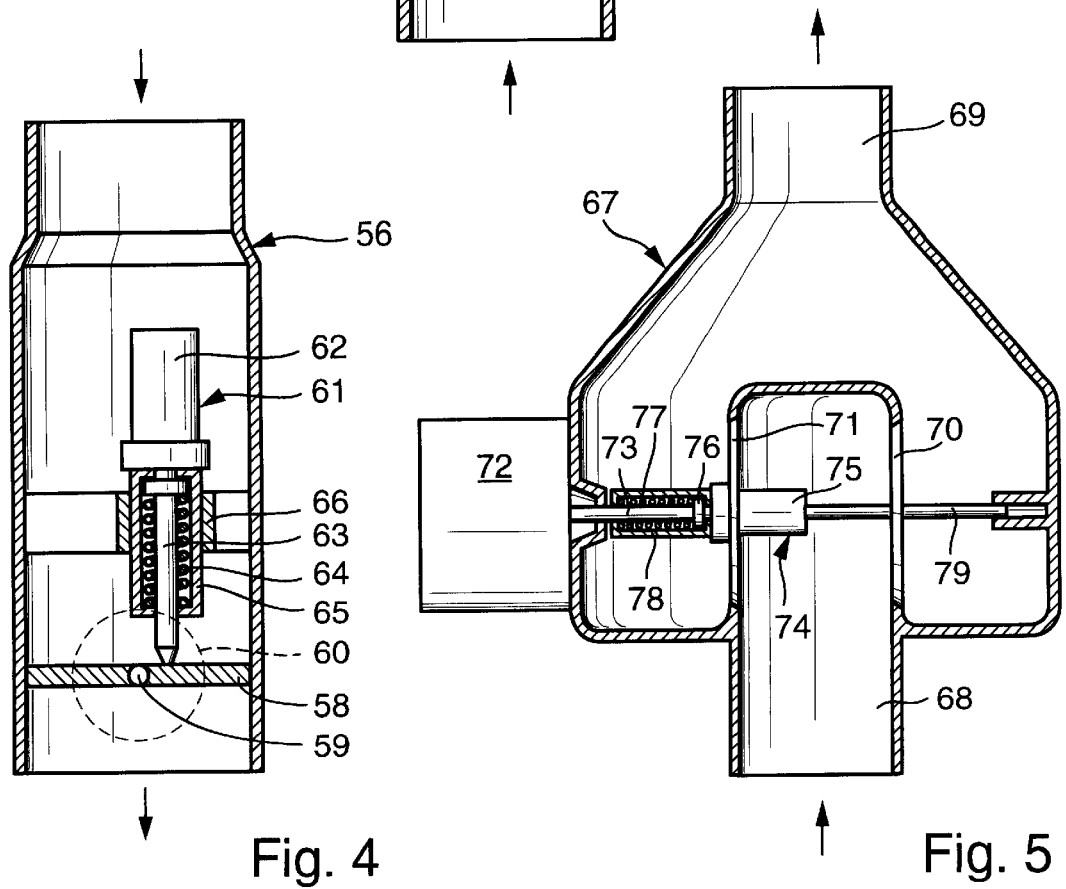
FIG. 4 is a cross-sectional view of a flow-through valve with a flap.
FIG. 5 is a cross-sectional view of a flow-through valve with two valve disks.

Referring now to FIG. 4, a tube-shaped valve housing 56 is illustrated in cross-section. Flap 58 operates as the valve member in this embodiment of the present invention, and can be turned around a rotating shaft 59 by means of an electrical actuating member 60 (represented by broken lines), which can be a proportional magnet, a DC motor, a linear motor, a step motor, or any other means for actuating rotating shaft 59. Electrical actuating member 60 is mounted coaxially with the axis of rotation of flap 58 and operates to rotate flap 58 between an open and a closed position. Thermostatic actuating member 61, whose working direction extends parallel with the direction of flow, is positioned within the valve housing on the inlet side of the flap 58. Housing 62 is filled with an expandable material (such as a wax mixture) that expands when heated above a predetermined temperature. The predetermined temperature will be selected according to the heat tolerances of the regulated system and will lie in the upper portion of the tolerated range, above the temperature of normal operation. When the predetermined temperature is exceeded, work piston 63 is extended out of housing 62 to drive flap 58. Work piston 63 is positioned such that the location of the interface between work piston 63 and flap 58 is at some distance from rotating shaft 59. When work piston 63 is extended, it exerts a torque, which opens flap 58. Restoring spring 62 is attached to an annular collar disposed on work piston 63, and the other end of restoring spring 62 is supported on retaining element 65, which encloses the work piston 63 and is fixedly attached to housing 62. Retaining element 65 holds thermostatic actuating member 61 in valve housing 56 on holder 66, which is fastened by means of radial links to the inner walls of valve housing 56.

Referring now to FIG. 5, valve housing 67 is provided with inlet 68 and outlet 69. Between inlet 68 and outlet 69 is positioned a valve member comprising two valve disks 70, 71, which can be simultaneously displaced transversely with respect to valve housing 67 by means of an electrical actuating member 72. As in all the other embodiments, electrical actuating member 72 can be a proportional magnet, a DC motor, a linear motor, a step motor, or any other means of driving valve disks 70, 71. A thermostatic actuating member 74 is positioned between drive element 73 and the valve disks 70, 71. Housing 75 of thermostatic actuating member 74 holds valve disk 71 by means of an annular collar. Valve disk 70 is mounted on bolt 79, which is in turn mounted to the end of housing 75 opposite drive element 73. Work piston 76 is located in the extension of drive element 73 of the actuating drive. Restoring spring 77 is attached at one end to work piston 76 and at the other to retaining element 78, onto which housing 75 has been fastened.

Housing 75 is filled with an expandable material (such as a wax mixture) that expands when heated above a predetermined temperature. The predetermined temperature will be selected according to the heat tolerances of the regulated system and will lie in the upper portion of the tolerated range, above the temperature of normal operation. When the predetermined temperature is exceeded, work piston 76 exerts a force on the extension of drive element 73, therefore driving housing 75 and valve disks 70, 71 into a position that is more open than that dictated solely by drive element 73.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention.

The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A valve system for regulating a heat-transferring system, comprising:
   a valve member;
   an electrical actuating member, for controllably actuating the valve member; and
   a thermostatic failsafe actuating member, for automatically actuating the valve member above a predetermined temperature which is higher than a normal operating temperature.

2. The valve of claim 1, wherein the valve member is a rotary slide valve.

3. The valve of claim 2, wherein the thermostatic actuating member actuates the rotary slide valve by means of an arm attached to a shaft of the rotary slide valve.

4. The valve of claim 1, wherein the thermostatic actuating member is located between the electrical actuating member and the valve member.

5. The valve of claim 1, wherein the thermostatic actuating member drives the valve member directly.

6. The valve of claim 1, further comprising:
   a restoring spring, wherein the restoring spring is attached to and exerts a biasing force on the thermostatic actuating member.

7. The valve of claim 1, further comprising:
   a mixing chamber; and
   a plurality of inlets, comprising at least one inlet disposed to communicate a hot fluid to the mixing chamber and at least one inlet disposed to communicate a cooled fluid to the mixing chamber.

* * * * *